United States Patent [19]
Guttag

[11] Patent Number: 5,466,333
[45] Date of Patent: Nov. 14, 1995

[54] PROCESS FOR RECYCLING PRINTED AND PLASTIC COATED PAPER

[76] Inventor: Alvin Guttag, Apt. No. 108, 415 Russell Ave., Gaithersburg, Md. 20877

[21] Appl. No.: 205,641

[22] Filed: Mar. 4, 1994

Related U.S. Application Data

[60] Continuation-in-part of Ser. No. 517,801, May 2, 1990, abandoned, which is a division of Ser. No. 213,342, Jun. 30, 1988, Pat. No. 4,952,426.

[51] Int. Cl.$^6$ .................................................. D21C 5/02
[52] U.S. Cl. ...................... 162/6; 162/4; 162/5; 101/491
[58] Field of Search ...................... 162/4, 5, 6; 101/491

[56] References Cited

U.S. PATENT DOCUMENTS

| | | | |
|---|---|---|---|
| 2,968,576 | 7/1955 | Keller et al. | 117/47 |
| 2,974,058 | 3/1961 | Pihl | 117/15 |
| 4,952,426 | 8/1990 | Guttag | 427/258 |
| 5,234,544 | 8/1993 | Naddeo | 162/5 |

Primary Examiner—W. Gary Jones
Assistant Examiner—Dean T. Nguyen
Attorney, Agent, or Firm—Cushman Darby & Cushman

[57] ABSTRACT

A process of recycling printed paper that contain a coating of a plastic olefin polymer by either (a) treating the deinked paper material with an oxidizing agent and reforming the deinked paper material into paper or (b) reforming the deinked paper material into paper and then treating the reformed paper with an oxidizing agent is described. The deinked paper material consists of fibers containing both cellulose and a plastic olefin polymer; fibers which are a mixture of cellulose fibers and fibers containing both cellulose and a plastic olefin polymer; fibers which are a mixture of cellulose fibers, fibers of a plastic olefin, and fibers containing both cellulose and a plastic olefin polymer; and fibers which are a mixture of fibers of a plastic olefin polymer and fibers containing both cellulose and a plastic olefin polymer.

10 Claims, No Drawings

PROCESS FOR RECYCLING PRINTED AND PLASTIC COATED PAPER

This application is a continuation-in-part of application Ser. No. 07/517,801 filed May 2, 1990, now abandoned, which in turn is a division of application Ser. No. 07/213,342, filed Jun. 30, 1988, which issued as U.S. Pat. No. 4,952,426 on Aug. 28, 1990. The entire disclosures of the parent application and its parent patent are hereby incorporated by reference and relied upon.

BACKGROUND OF THE INVENTION

1. Field of the Invention

The present invention relates to a process for recycling printed papers that contain a plastic olefin polymer coating.

The recycling of paper, and especially newspapers today is important for economical and environmental reasons. The printing ink on newspapers has a tendency to come off on the hands, especially while it is fresh, e.g. within the first two or three days. Not only is this messy but it is also dangerous after a prolonged exposure to the printing inks because they contain carbon black which has a number of carcinogens in it, for example benzopyrene and substituted benzopyrenes. The carcinogens are absorbed through the skin when the printing ink gets on the hands. Furthermore, some people are allergic to the printing ink.

Parent patent, U.S. Pat. No. 4,952,426, provides a process for coating paper having printed ink on its surface which comprises applying and adhering a transparent plastic to the paper while the ink is wet. Preferably the paper used is newsprint and the ink used contains carbon black.

When the transparent plastic coated paper of the parent patent contains an olefin polymer as the coating, there are problems in the recycling process since ink will not adhere well to the olefin polymer. Thus, after the deinking step in forming recycled paper and the subsequent printing on recycled paper containing the olefin polymer, printing ink will not adhere well to the olefin polymer portion of the paper which can thus result in unsatisfactory or non-uniform printing.

2. Description of the Related Art

It is known to improve the ability of printing ink to stick to olefin polymers by treating the polymer, eg. in film form, with an oxidizing agent, e.g. ozone, Corona discharge, chromic acid or an oxidizing flame, e.g. see U.S. Pat. No. 2,968,576. It would seem logical to accomplish this by simply adding the additional step of an oxidizing treatment after applying the transparent plastic coating to the paper having printing ink on its surface in the assembly line of forming the final printed paper in the parent patent. However, this has the problem that it prematurely renders the surface of the olefin polymer more susceptible to printing ink so that there will be a greater tendency of the coated paper to retain any ink it comes in contact with in its normal handling and use.

Of at least equal importance, the oxidizing treatment is a surface phenomenon. Consequently even if the surface of the olefin polymer is treated during the preparation of a newspaper, the treatment will not affect the rest of the plastic layer. In the recycling process there will be exposed the interior and bottom portions of the plastic which have not received the oxidizing treatment and consequently will not adhere as well as desired to the ink on the recycled paper which now is composed of not only cellulosic fibers but also fibers resulting from the olefin polymer used as a coating to prevent the ink from getting on the skin and hands of the reader or other handler of the original newspaper.

SUMMARY OF THE INVENTION

It has now been found that this printing adherence problem with olefin polymer-containing paper can be overcome by applying an oxidizing treatment in the deinking and/or subsequent steps in forming recycled paper containing the olefin polymer as part of the paper fibers. The oxidizing treatment can be accomplished for example by using Corona discharge or other source of ozone, oxidizing flame, chromic acid or bleaching agents used in making paper, e.g., chlorine or chlorine dioxide. Preferably, the oxidizing agent employed is hydrogen peroxide.

More specifically, the present invention relates to a process of recycling printed paper that contain a coating of a plastic olefin polymer, comprising either treating the deinked paper material with an oxidizing agent and reforming the deinked paper material into paper or reforming the deinked paper material into paper and then treating the reformed paper with an oxidizing agent. The deinked paper material consists of fibers containing both cellulose and a plastic olefin polymer; fibers which are a mixture of cellulose fibers and fibers containing both cellulose and a plastic olefin polymer; fibers which are a mixture of cellulose fibers, fibers of a plastic olefin, and fibers containing both cellulose and a plastic olefin polymer; and fibers which are a mixture of fibers of a plastic olefin polymer and fibers containing both cellulose and a plastic olefin polymer. The oxidizing agent treatment is sufficient to increase the adhesion of any exposed plastic olefin polymer to printing ink.

The present invention further relates to printed paper comprising fibers containing both cellulose and a plastic olefin polymer; fibers which are a mixture of cellulose fibers and fibers containing both cellulose and a plastic olefin polymer; fibers which are a mixture of cellulose fibers, fibers of a plastic olefin, and fibers containing both cellulose and a plastic olefin polymer; and fibers which are a mixture of fibers of a plastic olefin polymer and fibers containing both cellulose and a plastic olefin polymer.

The present invention also relates to olefin polymer-containing paper that has been subjected to an oxidizing treatment sufficient to increase the adherence of the plastic olefin polymer to printing ink.

DESCRIPTION OF THE PREFERRED EMBODIMENTS

The oxidizing agent treatment can be carried out either before or after the reformation of the paper but should be carried out prior to printing on the paper. In the case of using hydrogen peroxide as the oxidizing agent, it can be applied in either an aqueous solution or with an organic solvent and can be employed either before or after formation of the paper. Preferably, it is applied as an aqueous solution in the paper reformation process. In the case of using Corona discharge treatment for oxidation it is preferably applied after the reformation of the paper.

The hydrogen peroxide can be employed in the paper forming process in known manner but should be used in an amount sufficient not only to bleach the paper but to insure that printing ink will stick to the olefin polymer segments of the paper. The concentration of the hydrogen peroxide is not critical, e.g. it can be used as aqueous hydrogen peroxide at a concentration of, e.g. 0.05%, 1%, 3% or 10%. Of course, hydrogen peroxide should not be used at a concentration so high that there is a danger of an explosive mixture being present with the other materials present in the paper making process. The hydrogen peroxide (or other oxidizing agent) not only bleaches the cellulosic fibers in the paper but also renders the olefin polymer fibers more susceptible to retaining printing ink.

After the paper is formed, it can be used like any other recycled paper. Preferably, however, it is used to again form printed paper which is coated as described in the parent patent. For such use, it is particularly desirable to apply the plastic in molten form, e.g. by spray coating molten plastic on the printed paper or by passing the printed plastic through a trough of the molten plastic. The use of molten plastic for coating the printed paper containing both cellulosic fibers and plastic fibers has the advantage that the molten plastic will melt or soften the surface of the plastic fibers in the paper so that there will be better adherence of the plastic coating to the portions of the printed paper which are not printed upon. Thus, there will be an even better bond than occurs with paper that contains only cellulosic fibers.

While it is desirable to have the same olefin polymer for coating the printed recycled paper as is present in the recycled paper itself, this is not essential and different olefin polymers can be employed. Typical olefin polymers include linear polyethylene, cross-linked polyethylene, linear polypropylene, cross-linked polypropylene, ethylene-monoolefin copolymer, e.g. ethylene-propylene copolymer, ethylene-butylene copolymer, ethylene-amylene copolymer and polyamylene. If a cross-linked polymer is used for the coating of the recycled printed paper, the amount of cross-linking should not be sufficient to prevent melting if the molten application procedure is employed.

When molten olefin polymer is applied as a film to the printed reformed paper in the parts of the paper which are not printed on, it will fuse with part of the exposed olefin polymer in the fibers thus forming a film coating integrally locked with the fibers. Consequently, the film will be bonded even more strongly to the paper than the film bonds to regular cellulose paper not containing plastic olefin polymer in any of the fibers, e.g., such as the paper used in my parent patent.

The addition of the oxidizing agent, e.g. hydrogen peroxide, can be carried out after deinking using conventional procedures for treatment of cellulose fibers with an oxidizing agent in paper making processes. See, for example Kirk-Othmer, Encyclopedia of Chemical Technology, 4th edition (1992), pages 301–312 and the references cited therein. The entire disclosure of Kirk-Othmer and its cited references are hereby incorporated by reference and relied upon. Attention is especially called to the use of hydrogen peroxide on page 304 and its use with mechanical pulp on page 307.

Attention is also called to Kirk-Othmer, Encyclopedia of Chemical Technology, 3rd edition (1984), Volume 19, page 413 and pages 986–992, the entire disclosures of which (included cited references) is hereby incorporated by reference and relied upon. Page 413 discloses bleaching pulp (i.e. cellulose pulp) with 1–3% hydrogen peroxide, 1.1% NaOH and 5% sodium silicate and 0.05% magnesium silicate at a consistency of 12%. Pages 986–992 are directed to recycling regular cellulose paper.

There is also incorporated by reference and relied upon Ullmann's Encyclopedia of Industrial Technology, 5th edition (1986), Volume A18, pages 545–691, directed to paper treatment, especially see pages 588–589 and the cited references.

The paper employed in the recycling procedure and the subsequent steps can either be made from coated paper prepared according to the parent patent alone or can be a mixture of such paper with pure cellulosic paper or other paper blends. As a rule the cellulose content should be a majority of the paper by weight. Thus, for example 0.05 to 40%, generally 1 to 15%, of the recycled paper will be made of olefin polymer.

When the deinked paper treated according to the present invention is used to make recycled paper as indicated above, it can be used alone or it can be blended with recycled fibers from pure cellulose paper and/or with virgin cellulose fibers. Thus, for example, anywhere from 1 to 100%, usually at least 50% of the fibers by weight in the blend of fibers to make the recycled paper can be fibers treated according to the present invention with the balance, if any, of the fibers being untreated cellulose fibers.

Thus, the deinked paper can consist of fibers containing both cellulose and a plastic olefin polymer; fibers which are a mixture of cellulose fibers and fibers containing both cellulose and a plastic olefin polymer; fibers which are a mixture of cellulose fibers, fibers of a plastic olefin polymer and fibers containing both cellulose and a plastic olefin polymer; and (4) fibers which are a mixture of fibers of a plastic olefin polymer and fibers containing both cellulose and a plastic olefin polymer.

While the printing ink will usually contain carbon black, the invention also will work with other inks alone or in addition to carbon black.

EXAMPLE

Deinked newsprint fibers containing about 6% polyethylene by weight at a pulp consistency of 15% are treated with 2% hydrogen peroxide and 1.1% sodium hydroxide at a pH of 10.5. The aqueous mixture is maintained at 70° C. for 60 minutes. The pulp is then formed into paper in conventional manner and printed with a carbon black ink. After the printing ink has been applied and while it is still wet, the paper is sprayed with molten polyethylene to completely cover the ink treated surface to a thickness of 1 mil in the manner mentioned in the parent patent.

What is claimed is:

1. A process of recycling printed paper containing a coating of a plastic olefin polymer, comprising either:
   (A) deinking said printed paper to form a deinked paper slurry, then treating said deinked paper slurry with an oxidizing agent, and then reforming said deinked paper slurry into recycled paper, or
   (B) deinking said printed paper to form a deinked paper slurry, then reforming said deinked paper slurry into recycled paper, and then treating said recycled paper with an oxidizing agent,
   said deinked paper consisting essentially of a member of the group consisting of
   (1) fibers containing both (a) cellulose and (b) a plastic olefin polymer;
   (2) fibers which are a mixture of (a) cellulose fibers and (b) fibers containing both (i) cellulose and (ii) a plastic olefin polymer;
   (3) fibers which are a mixture of (a) cellulose fibers, (b) fibers of a plastic olefin polymer, and (c) fibers containing both (i) cellulose and (ii) a plastic olefin polymer; and
   (4) fibers which are a mixture of (a) fibers of a plastic olefin polymer and (b) fibers containing both (i)

cellulose and (ii) a plastic olefin polymer,
wherein at least some of said plastic olefin polymer is exposed to the surface of said deinked paper and recycled paper of steps (A) or (B), said oxidizing agent treatment being sufficient to increase the adhesion of said exposed plastic olefin polymer to printing ink, followed by printing on said recycled paper.

2. A process comprising printing on recycled paper prepared according to claim 1, and then coating said recycled printed paper with a transparent plastic olefin polymer.

3. A process according to claim 2, wherein said transparent plastic olefin polymer is coated in molten form.

4. A process according to claim 3, wherein said transparent plastic olefin polymer is sprayed on said printed recycled paper and adheres to the unprinted portion of olefin fibers in the paper.

5. A process according to claim 3, wherein said transparent plastic olefin polymer is sprayed on said recycled printed paper.

6. A process according to claim 1, wherein the olefin fibers are 1–15% by weight of the fibers in the recycled paper.

7. A process according to claim 1, wherein said oxidizing agent of step (B) is a corona discharge treatment and said corona discharge treatment is carried out after the reformation of the paper.

8. A process according to claim 1, wherein said oxidizing agent of step (A) is aqueous hydrogen peroxide and said aqueous hydrogen peroxide is applied to the fibers prior to the reformation of the paper.

9. A process according to claim 1, wherein said printed paper is newsprint.

10. A process according to claim 1, wherein said printing ink includes carbon black therein.

* * * * *